US009027119B2

(12) United States Patent
Bentley et al.

(10) Patent No.: US 9,027,119 B2
(45) Date of Patent: *May 5, 2015

(54) AUTHENTICATION FREQUENCY AND CHALLENGE TYPE BASED ON APPLICATION USAGE

(75) Inventors: Jon Louis Bentley, New Providence, NJ (US); George William Erhart, Loveland, CO (US); Lawrence O'Gorman, Madison, NJ (US); Michael J. Sammon, Watchung, NJ (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 1052 days.

This patent is subject to a terminal disclaimer.

(21) Appl. No.: 12/240,912

(22) Filed: Sep. 29, 2008

(65) Prior Publication Data

US 2009/0133117 A1    May 21, 2009

Related U.S. Application Data

(63) Continuation-in-part of application No. 11/942,670, filed on Nov. 19, 2007, now Pat. No. 8,918,079.

(51) Int. Cl.
*H04L 9/32* (2006.01)
*H04L 29/06* (2006.01)

(52) U.S. Cl.
CPC .......... *H04L 9/3271* (2013.01); *H04L 63/0846* (2013.01)

(58) Field of Classification Search
CPC ... H04L 63/08; H04L 9/3271; H04L 63/0846; H04W 12/06

USPC ................ 726/2–7, 17–18, 21; 455/411, 410; 713/152, 182–186, 166
See application file for complete search history.

(56) References Cited

U.S. PATENT DOCUMENTS

| 5,768,503 | A | 6/1998 | Olkin |
| 6,014,085 | A | 1/2000 | Patel |
| 6,859,651 | B2 | 2/2005 | Gabor |
| 7,024,556 | B1 * | 4/2006 | Hadjinikitas et al. ......... 713/168 |
| 7,120,129 | B2 | 10/2006 | Ayyagari et al. |

(Continued)

OTHER PUBLICATIONS

Patel, Munjalkumar C., "U.S. Appl. No. 11/942,670 Office Action Feb. 3, 2011",, Publisher: USPTO, Published in: US.

(Continued)

*Primary Examiner* — Shewaye Gelagay
*Assistant Examiner* — Shanto M Abedin

(57) ABSTRACT

An apparatus and method are disclosed for determining authentication frequency (i.e., the length of time between authenticating and re-authenticating a user) and challenge type (e.g., username/password, fingerprint recognition, voice recognition, etc.) based on what software applications a user is running on a data-processing system, and how those applications are being used (e.g., what functions are used, what data is input to or output by the application, how often and for how long applications are used, what input devices and output devices are used, etc.) Advantageously, the illustrative embodiment enables authentication frequency and challenge type to be adjusted based on the likelihood of malicious activity and/or the potential cost of malicious activity, as inferred from current and past application usage. In addition, the illustrative embodiment enables selection of an authentication challenge type that is less intrusive to a user based on current application usage.

20 Claims, 2 Drawing Sheets

(56) References Cited

U.S. PATENT DOCUMENTS

| | | | |
|---|---|---|---|
| 7,237,024 B2 | 6/2007 | Toomey | |
| 7,577,987 B2 | 8/2009 | Mizrah | |
| 7,805,128 B2* | 9/2010 | Bentley et al. | 455/411 |
| 7,814,324 B2 | 10/2010 | Blakley et al. | |
| 7,860,486 B2* | 12/2010 | Frank et al. | 455/410 |
| 8,009,121 B1 | 8/2011 | Stuart et al. | |
| 8,027,665 B2* | 9/2011 | Frank | 455/411 |
| 8,370,639 B2* | 2/2013 | Azar et al. | 713/186 |
| 8,584,200 B2* | 11/2013 | Frank | 726/2 |
| 2002/0152034 A1 | 10/2002 | Kondo et al. | |
| 2002/0178359 A1* | 11/2002 | Baumeister et al. | 713/169 |
| 2004/0006710 A1* | 1/2004 | Pollutro et al. | 713/201 |
| 2005/0015592 A1* | 1/2005 | Lin | 713/166 |
| 2005/0097320 A1* | 5/2005 | Golan et al. | 713/166 |
| 2006/0015725 A1* | 1/2006 | Voice et al. | 713/168 |
| 2006/0089125 A1* | 4/2006 | Frank | 455/411 |
| 2006/0105744 A1* | 5/2006 | Frank | 455/411 |
| 2007/0008937 A1* | 1/2007 | Mody et al. | 370/338 |
| 2007/0250920 A1 | 10/2007 | Lindsay | |
| 2008/0046785 A1* | 2/2008 | Gilgen et al. | 714/47 |
| 2008/0146193 A1 | 6/2008 | Bentley et al. | |
| 2008/0162338 A1* | 7/2008 | Samuels et al. | 705/38 |
| 2008/0189768 A1* | 8/2008 | Callahan et al. | 726/4 |
| 2009/0007229 A1* | 1/2009 | Stokes | 726/2 |
| 2009/0013381 A1 | 1/2009 | Torvinen et al. | |
| 2009/0023422 A1 | 1/2009 | McInnis et al. | |
| 2009/0183248 A1 | 7/2009 | Tuyls et al. | |
| 2009/0198820 A1* | 8/2009 | Golla et al. | 709/228 |

OTHER PUBLICATIONS

Patel, Munjalkumar C., "U.S. Appl. No. 11/942,670 Restriction Requirement Oct. 29, 2010",, Publisher: USPTO, Published in: US.

Patel, Munjalkumar C., "U.S. Appl. No. 11/942,670 Office Action May 13, 2011",, Publisher: USPTO, Published in: US.

Lee, Jason T., "U.S. Appl. No. 12/241,584 Office Action May 9, 2011",, Publisher: USPTO, Published in: US.

Lee, Jason T., "U.S. Appl. No. 12/241,584 Restriction Requirement Feb. 16, 2011",, Publisher: USPTO, Published in: US.

Chetty et al, "Audio-visual multimodal fusion for biometric person authentication and liveness verification," *Proceedings of the 2005 NICTA-HCSNet Multimodal User Interaction Workshop*, 2006, 78 pages.

Ratha et al., "Enhancing security and privacy in biometrics-based authentication systems," *IBM Systems Journal*, 2001, 21 pages.

* cited by examiner

US 9,027,119 B2

AUTHENTICATION FREQUENCY AND CHALLENGE TYPE BASED ON APPLICATION USAGE

CROSS-REFERENCE TO RELATES APPLICATIONS

This application is a continuation-in-part of U.S. patent application Ser. No. 11/942,670, filed 19 Nov. 2007 (now pending), entitled "Determining Authentication Challenge Timing And Type".

FIELD OF THE INVENTION

The present invention relates to computer security in general, and, more particularly, to authentication.

BACKGROUND OF THE INVENTION

In some instances it is desirable for security reasons to require that the user of a data-processing system (e.g., a wireless telecommunications terminal, a personal computer, a server, etc.) be authenticated before the user is permitted to access an application or resource of the data-processing system. Typically a user is presented with an authentication challenge, and the user must supply a valid response to the challenge. Examples of different types of authentication challenges include:

- requiring a user to furnish his or her username and password;
- requiring a user to consult an electronic token device or a list of numbers in order to furnish a one-time password;
- requiring a user to answer a pre-arranged secret question (e.g., "What is your mother's maiden name?", "What was your first telephone number?", etc.); and
- biometrics (e.g., fingerprint recognition, voice recognition, retinal or iris scan, etc.).

Furthermore, in some instances the user of wireless telecommunications terminal 110 might be periodically challenged (i.e., the user is periodically re-authenticated) for greater security.

SUMMARY OF THE INVENTION

The present invention enables authentication frequency (i.e., the length of time between authenticating and re-authenticating a user) and challenge type (e.g., username/password, fingerprint recognition, voice recognition, etc.) to be determined based on what software applications a user is running on a data-processing system (e.g., a payroll application, a browser-based banking application, an email client, etc.), and how those applications are being used (e.g., what functions are used, what data is input to or output by the application, how often and for how long applications are used, what input devices are used, what output devices are used, the speed and manner in which data is input to an application, etc.) In accordance with the illustrative embodiment, both current and historical application usage can be considered in these determinations.

The present invention is advantageous in that it enables authentication frequency to be increased (i.e., less time between re-authentication challenges, which corresponds to tighter security) and the challenge type to be stronger (i.e., more secure) in situations where it is more likely that a malicious user has gained access to a data-processing system, or where a false person having access can be dangerous to the real user. For example, such situations might include:

- when there is a large withdrawal from a banking application;
- when a particular operation in a human-resources application is invoked repeatedly for several different employees;
- when application usage is substantially different than the norm for a particular data-processing system at a particular day and time (say, a weekday morning); or
- when the semantic content of a message sent via an email client application is unusual, or might be damaging to the real user or his or her employer.

The present invention also advantageously enables the selection of an authentication challenge type that is less intrusive to a user based on current application usage. For example, a voice recognition challenge might be issued when a user is typing away at the keyboard in a spreadsheet application, while a typed username/password challenge might be issued when a user is playing a voice-controlled videogame.

The illustrative embodiment comprises: presenting a first authentication challenge at a data-processing system at time $t_1$; and presenting a second authentication challenge at a data-processing system at time $t_2$; wherein the magnitude of $t_2-t_1$ is based on usage of one or more applications of said data-processing system at one or more instants in time interval $[t_1, t_2]$.

DETAILED DESCRIPTION

For the purposes of the specification and claims, the term "calendrical time" is defined as indicative of one or more of the following:

(i) a time (e.g., 16:23:58, etc.),
(ii) one or more temporal designations (e.g., Tuesday, November, etc.),
(iii) one or more events (e.g., Thanksgiving, John's birthday, etc.), and
(iv) a time span (e.g., 8:00 PM to 9:00 PM, etc.).

Figure 1:
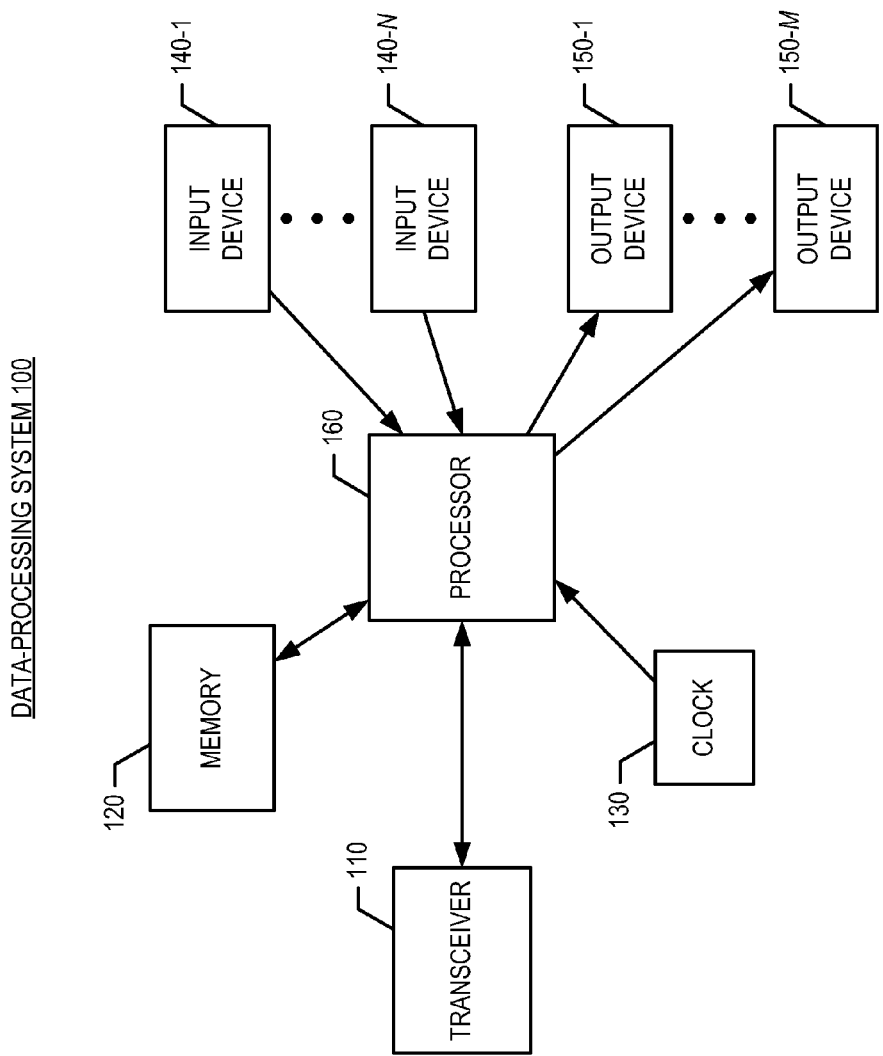
FIG. 1 depicts the salient elements of data-processing system 100, in accordance with the illustrative embodiment of the present invention.

FIG. 1 depicts the salient elements of data-processing system 100, in accordance with the illustrative embodiment of the present invention. As shown in FIG. 1, data-processing system 100 comprises transceiver 110, memory 120, clock 130, input devices 140-1 through 140-N, where N is a positive integer, output devices 150-1 through 150-M, where M is a positive integer, and processor 160, interconnected as shown.

Transceiver 110 is capable of receiving external signals (e.g., via a wired network, via a wireless network, etc.) and forwarding information encoded in these signals to processor 160, and of receiving information from processor 160 and transmitting signals that encode this information (e.g., via a wired network, via a wireless network, etc.), in well-known fashion.

Memory 120 is capable of storing data, program source code, and executable instructions, as is well-known in the art, and might be any combination of random-access memory (RAM), flash memory, disk drive, etc. These are examples of non-transitory computer-readable storage media which store instructions for controlling a processor to perform certain steps that are disclosed herein. In accordance with the illustrative embodiment, memory 120 is capable of storing one or more applications (e.g., a payroll application, a video game, an email client, etc.), and of storing information regarding the use of these applications, such as how often an application is used, the time of last use, what functions in an application are used, how often functions are used, and so forth.

Clock 130 is capable of transmitting the current time, date, and day of the week to processor 160, in well-known fashion.

Input devices 140-1 through 140-N are capable of receiving input from a user and of forwarding the input to processor 160, in well-known fashion. Examples of input devices 140-1 through 140-N might include a numeric keypad, an alphanumeric keyboard, a fingerprint sensor, a microphone, a magnetic card reader, and so forth.

Output devices 150-1 through 150-M are capable of receiving information, including authentication challenges, from processor 160, and of outputting the information to a user, in well-known fashion. Examples of output devices 150-1 through 150-M might include a video display, a speaker, a vibration mechanism, and so forth.

Processor 160 is a general-purpose processor that is capable of reading data from and writing data into memory 120, of executing applications stored in memory 120, and of executing the tasks described below and with respect to FIG. 2. As will be appreciated by those skilled in the art, in some embodiments of the present invention processor 160 might be a special-purpose processor, rather than a general-purpose processor.

Figure 2:
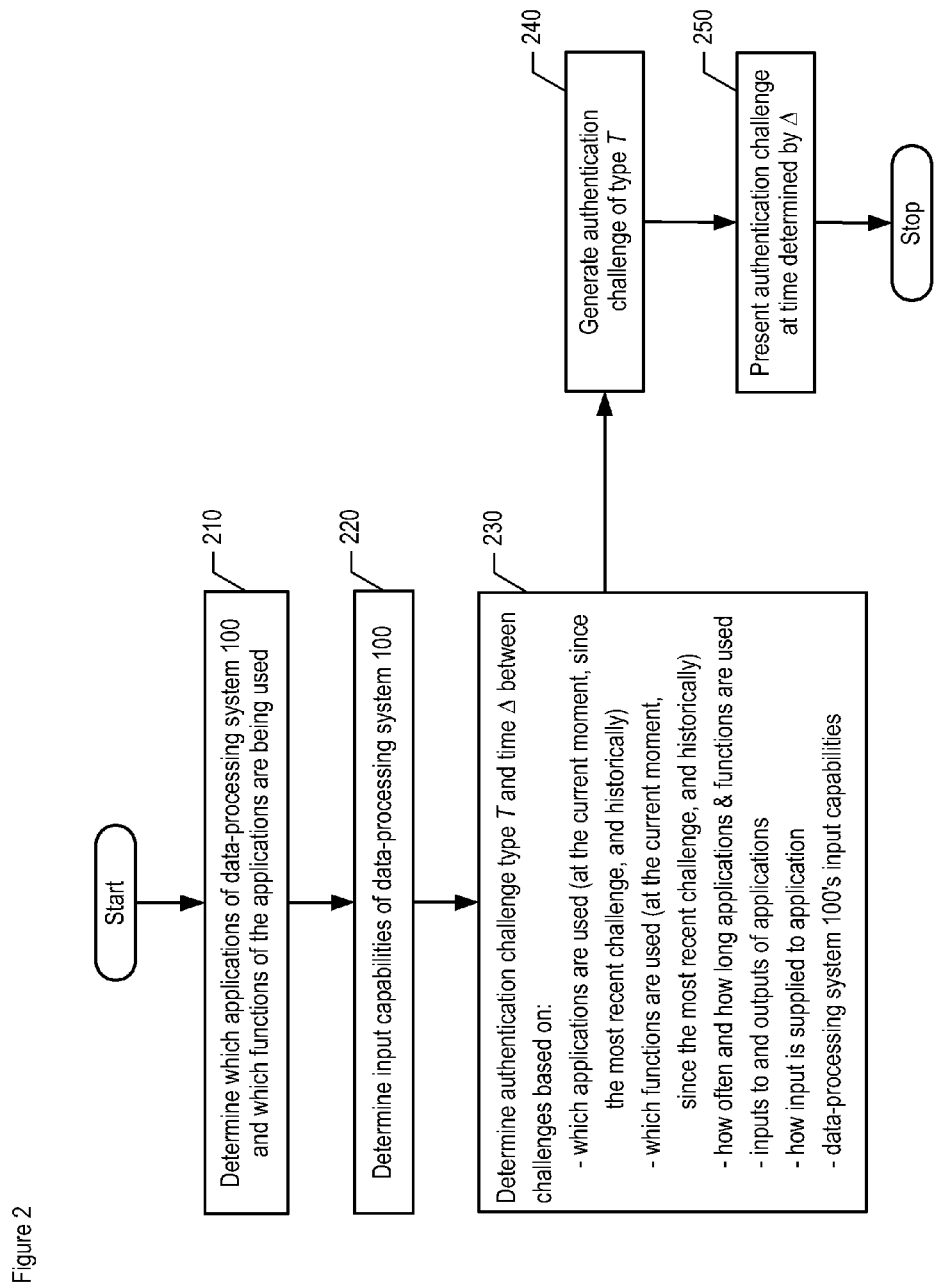
FIG. 2 depicts a flowchart of a method for determining re-authentication challenge frequency and type, in accordance with the illustrative embodiment of the present invention.

FIG. 2 depicts a flowchart of a method for determining re-authentication challenge frequency and type, in accordance with the illustrative embodiment of the present invention. In accordance with the illustrative embodiment, the tasks of FIG. 2 are performed by data-processing system 100. As will be appreciated by those skilled in the art, however, in some other embodiments of the present invention, one or more tasks of FIG. 2, such as the determination of the challenge frequency and type at task 240, might instead be performed by another entity (e.g., an authentication server, etc.) and the result transmitted to transceiver 110 of data-processing system 100.

At task 210, data-processing system 100 determines which of its applications are being used, and which functions of the applications are being used, in well-known fashion.

At task 220, the input capabilities of data-processing system 100 are determined. As will be appreciated by those skilled in the art, in embodiments of the present invention in which task 220 is performed by data-processing system 100 itself, data-processing system 100 merely has to check which of input devices 140-1 through 140-N are currently enabled and functional; while in some other embodiments of the present invention, an authentication server or some other entity might transmit a message to data-processing system 100 that explicitly asks for its input capabilities; while in yet some other embodiments, an authentication server or some other entity might transmit a message to data-processing system 100 that asks for its manufacturer and model (e.g., Apple iPhone®, etc.), and then consult a database to determine the input capabilities of data-processing system 100 (under the assumption that all of data-processing system 100's capabilities are currently enabled and functional).

At task 230, an authentication challenge type T and time Δ between challenges are determined based on:
  which applications of data-processing system 100 are currently being used, and for how long
  which applications of data-processing system 100 have been used since the last authentication challenge at data-processing system 100, as well as how often and for how long
  historical usage of these applications, both in general and with respect to the current calendrical time
  which application functions are currently being used,
  which application functions have been used since the last authentication challenge at data-processing system 100, and how often they have been used
  historical usage of application functions, both in general and with respect to the current calendrical time
  inputs to applications (e.g., the values of data, the number of inputs, the semantic content of text or spoken inputs, etc.),
  outputs from applications (e.g., the values of data, the number of outputs, the type of outputs [e.g., audio, text, etc.], the semantic content of an output, etc.),
  how input is supplied to applications (e.g., which input devices are used, the speed and manner in which input is supplied, such as how fast a user types or how often the backspace is used to make corrections, etc.), and
  the input capabilities of data-processing system 100.

As will be appreciated by those skilled in the art, by considering what application functions are used and what inputs are supplied to the functions, the illustrative embodiment is capable of considering the potential cost or harm to the real user, or to his or her organization, in the determinations of task 230. For example, a large cash withdrawal or a drastic reduction in the price of an item for sale could be very costly to the real user, while a defaced web page or a denial of service attack could result in unfavorable press for the real user's employer.

As will further be appreciated by those skilled in the art, in some embodiments of the present invention, an authentication challenge type might comprise a plurality of successive challenges, rather than a single challenge, thereby enabling even "stronger" authentication challenges. For example, a challenge type determined at task 230 might be "fingerprint recognition, followed by iris scan."

As will further be appreciated by those skilled in the art, for embodiments of the present invention in which task 230 is performed by data-processing system 100, the current day and time might be obtained from clock 130, or might be obtained from an external source via transceiver 110. Moreover, although in the illustrative embodiment historical application usage information is stored in memory 120, in some other embodiments of the present invention this information might be stored in an external database and accessed by data-processing system 100 via transceiver 110. As will further be appreciated by those skilled in the art, in some embodiments of the present invention, the collection, storing, and organization of this historical information might be performed by data-processing system 100 itself, while in some other embodiments of the present invention, another entity (e.g., an authentication server, etc.) might perform these functions.

At task 240, an authentication challenge of type T is generated, in well-known fashion.

At task 250, the authentication challenge generated at task 240 is presented to the user of data-processing system 100 at a time in accordance with Δ, in well-known fashion. After task 250, the method of FIG. 2 terminates.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   presenting, via a processor, a first authentication challenge at a device at a first time;
   determining, via the processor, a time interval for presenting a second authentication challenge based on (i) an application currently being accessed at the device, (ii) a time duration for which the application is used at the device since the first time, and (iii) input capabilities of the device; and
   presenting, via the processor, the second authentication challenge at the device at a second time, wherein the second time is determined based on the time interval, and wherein a challenge type associated with the second authentication challenge is determined based on a function performed by the application.

2. The method of claim 1, wherein the time interval is determined, at a third time, further based on usage of the application prior to the third time.

3. The method of claim 1, wherein at least one of the challenge type or the time interval is determined further based on an identity of the application.

4. The method of claim 1, wherein the time interval is determined further based on a function that is used in the application.

5. The method of claim 1, wherein the time interval is determined further based on an input to the application.

6. The method of claim 1, wherein the time interval is determined further based on an output of the application.

7. The method of claim 1, wherein the time interval is determined further based on how input is supplied to the application.

8. The method of claim 1, wherein the time interval is determined further based on how much time the application is used for before the first time.

9. The method of claim 1, wherein the time interval is determined further based on how often the application is used.

10. The method of claim 1, wherein the time interval is determined further based on how often a function of the application is used.

11. A computer-readable storage device storing instructions which, when executed by a processor, cause the processor to perform operations comprising:
    presenting a first authentication challenge at a device at a first time;
    determining a time frame for presenting a second authentication challenge at the device based on (i) an application currently being accessed at the device, (ii) a time duration for which the application is used at the device since the first time, and (iii) input capabilities of the device; and
    presenting the second authentication challenge at the device at a second time, wherein the second time is determined based on the time frame, and wherein a challenge type associated with the second authentication challenge is determined based on a function performed by the application.

12. A system comprising:
    a processor; and
    a non-transitory computer-readable storage medium storing instructions which, when executed by the processor, cause the processor to perform operations comprising:
       presenting a first authentication challenge at a device at a first time;
       determining a magnitude of a time frame for presenting a second authentication challenge based on (i) an application currently being accessed at the device, (ii) a time duration for which the application is used at the device since the first time, and (iii) input capabilities of the device; and
       presenting the second authentication challenge at the device at a second time, wherein the second time is determined based on the magnitude, and wherein a challenge type associated with the second authentication challenge is determined based on a function performed by the application.

13. The system of claim 12, wherein the time interval is determined, at a third time, further based on usage of the application prior to the third time.

14. The system of claim 12, wherein at least one of the challenge type or the time interval is determined further based on an identity of the application.

15. The system of claim 12, wherein the time interval is determined further based on a function that is used in the application.

16. The system of claim 12, wherein the time interval is determined further based on an input to the application.

17. The system of claim 12, wherein the time interval is determined further based on an output of the application.

18. The system of claim 12, wherein the time interval is determined further based on a duration of time the application is used for before the first time.

19. The system of claim 12, wherein the time interval is determined further based on how often the application is used.

20. The system of claim 12, wherein the time interval is determined further based on how often a function of the application is used.

* * * * *